Figure 1:
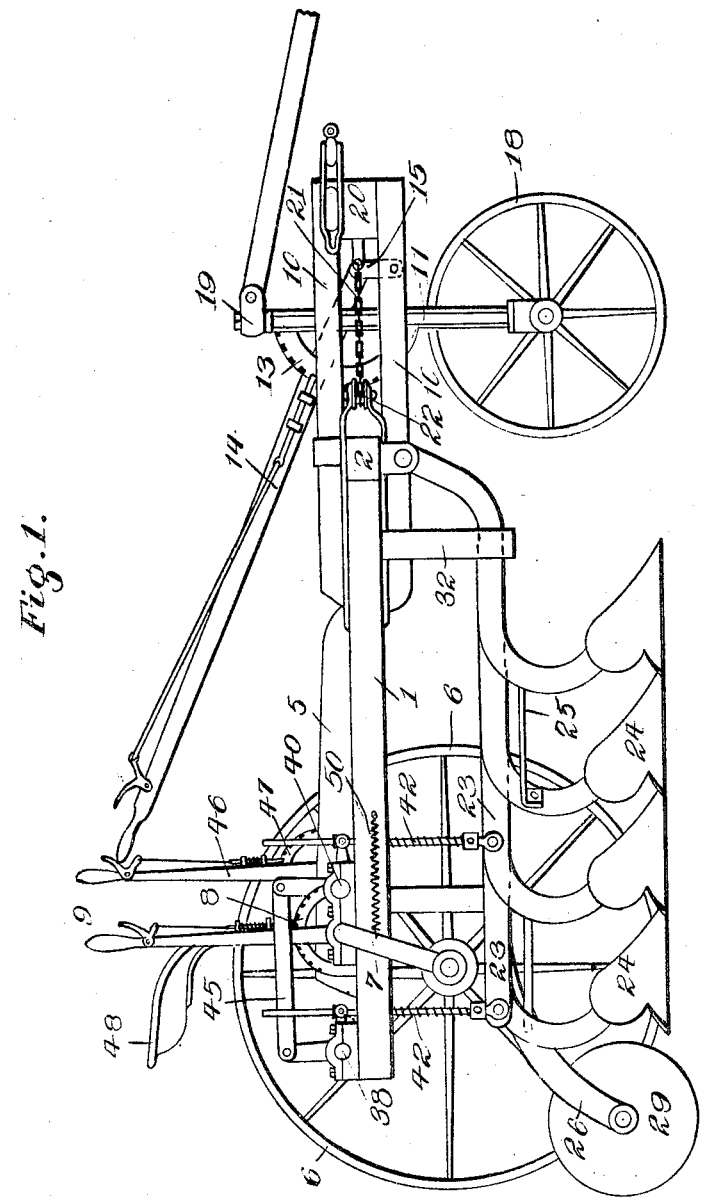

No. 821,979. PATENTED MAY 29, 1906.
C. BJORKLUND.
GANG CULTIVATOR.
APPLICATION FILED DEC. 21, 1905.

3 SHEETS—SHEET 1.

Inventor
Chas. Bjorklund

Witnesses

By
R. H. A. P. Lacey, Attorney

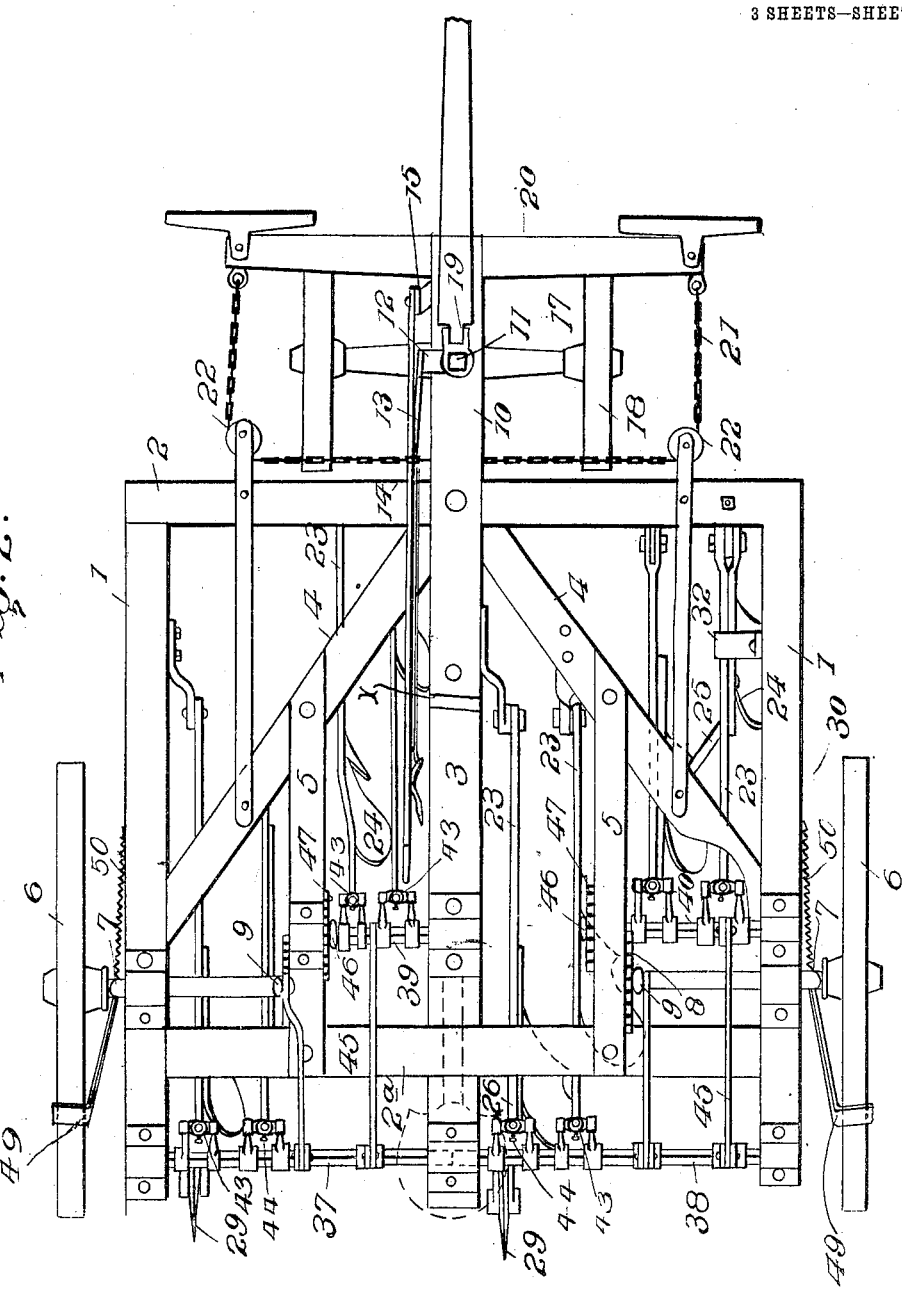

No. 821,979. PATENTED MAY 29, 1906.
C. BJORKLUND.
GANG CULTIVATOR.
APPLICATION FILED DEC. 21, 1905.
3 SHEETS—SHEET 3.
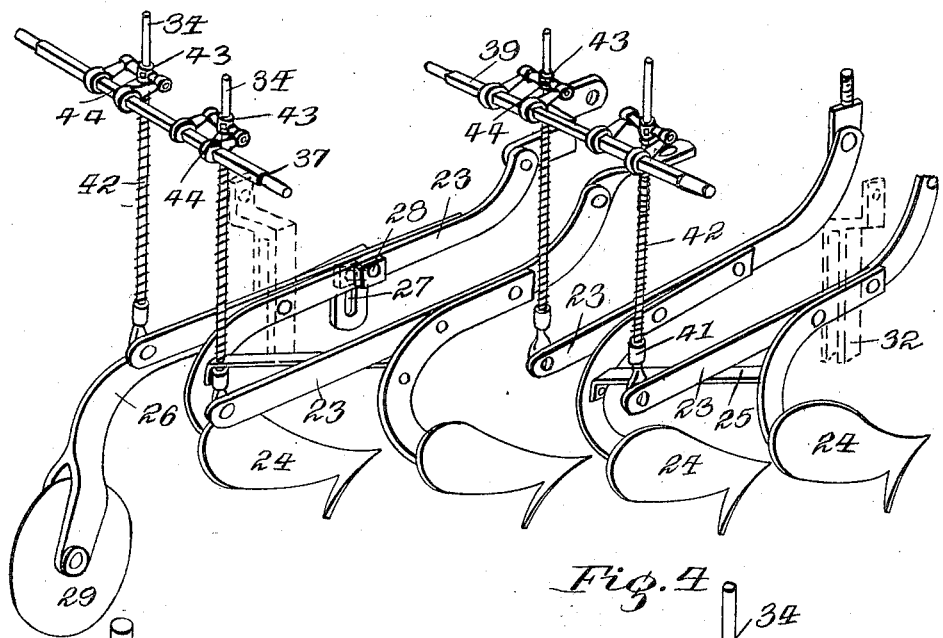
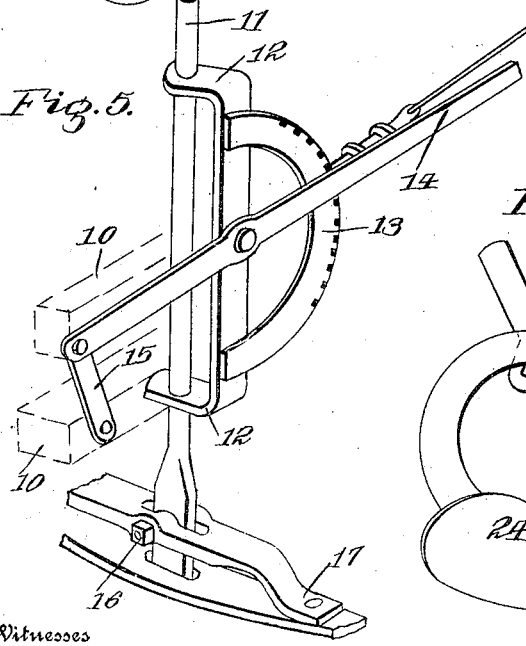
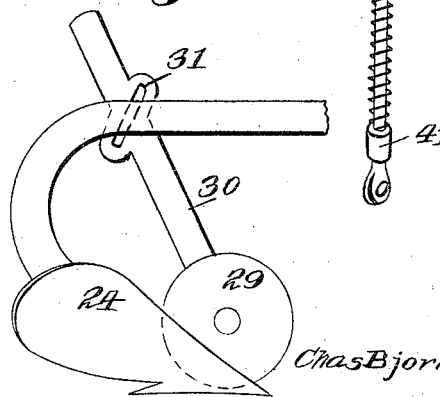
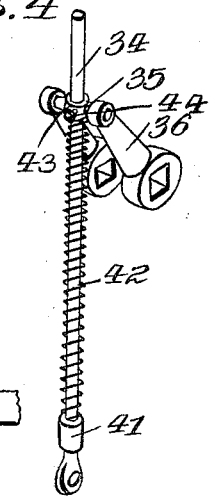
Witnesses
Inventor
Chas Bjorklund
By R. V. A. B. Lacey
Attorneys

UNITED STATES PATENT OFFICE.

CHARLES BJORKLUND, OF BOWESMONT, NORTH DAKOTA.

GANG-CULTIVATOR.

No. 821,979.      Specification of Letters Patent.      Patented May 29, 1906.

Application filed December 21, 1905. Serial No. 292,777.

*To all whom it may concern:*

Be it known that I, CHARLES BJORKLUND, a citizen of the United States, residing at Bowesmont, in the county of Pembina and State of North Dakota, have invented certain new and useful Improvements in Gang-Cultivators, of which the following is a specification.

This invention relates to cultivators of that class employing a gang of cultivating devices arranged for simultaneous movement; and the object of the invention is to provide a cultivator of this character which will embody an improved construction whereby to provide against lateral strain of the mechanism as a whole and of the individual plows or cultivating devices thereof, which will also embody improved means for leveling the cultivator as a whole, so that it will run easily over uneven ground, and which, in short, will embody an improved arrangement of parts which will admit of their adjustment to meet the different conditions of soil and work that will be required of the device.

For a full description of the invention and the merits thereof and also to acquire a knowledge of the details of construction of the means for effecting the result reference is to be had to the following description and accompanying drawings, in which—

Figure 1 is a side elevation of my improved gang-cultivator. Fig. 2 is a plan view thereof. Fig. 3 is a detail perspective view illustrating the yielding connection between the draw-bars and their actuating rock-shafts. Fig. 4 is a detail perspective view of parts of said yielding connections. Fig. 5 is a detail perspective view, on an enlarged scale, illustrating the mounting of the front truck of the cultivator. Fig. 6 is a detail view illustrating one of the detachable colters for the individual cultivator shovels or plows.

Corresponding and like parts are referred to in the following description and indicated in all the views of the drawings by the same reference characters.

The framework of my improved gang-cultivator comprises two side bars 1, connected together at their front ends by a cross-bar 2 and also connected near their rear ends with a similar cross-bar 2ª and a central longitudinal bar 3. The bars 1 and 3 extend rearwardly beyond the rearmost cross-bar 2, as shown. The framework of the cultivator is braced by means of diagonal braces 4, extending from about the middle of the two side bars to the front cross-bar at about the middle thereof, and it is further braced by means of quadrant-bars 5, which extend parallel with the side bars and are supported on the diagonal braces at one end and on the rearmost cross-bar at the other end.

The traveling wheels 6 are mounted on independent crank-axles 7, each of which is journaled in suitable boxing and extending between the quadrant-bars 5 and the adjacent side bars 1. Quadrants 8 are secured to the inner face of the quadrant-bars 5, and hand-levers are secured on the inner ends of the cranked axles 7 and are provided with the customary detents designed for engagement with the teeth of the quadrants. By means of the manipulation of the said levers 9 either one or both of the crank-axles may be turned and held in adjusted positions, so that the cultivator as a whole may be raised either one end or the other or both ends to level the same.

Extending forwardly from the central longitudinal bar 3 are upper and lower horizontally-extending bars 10, which are rigidly secured at their rear ends to the framework of the cultivator and constitute a truck-frame. The said bars 10 are provided with vertically-extending bearings, in which a post 11 is mounted. The said post is susceptible of being turned axially in a horizontal plane and also susceptible of being moved up and down in its bearing. The upper end of the post 11 extends through the lateral end of a bracket 12, which is secured to the truck-post 11 at its lower end and supports a quadrant 13, designed for engagement by a hand-lever 14, which is fulcrumed intermediate its ends on the said bracket and is secured to the frame 10 at its forward end by means of a link 15. The hand-lever 14 is provided with the usual hand-retracted detent designed for engagement with any of the teeth of the quadrant, and by the manipulation of the lever the post may be moved up and down in the truck-frame 10 and may be held at different elevations therein. To the lower end of the said post there is secured a horizontally-extending spindle 16, to which the truck 17 is pivotally mounted between its ends, so that it may rock from side to side thereon, and each end of the truck carries a traveling wheel 18. By means of this freely-rocking mounting of the truck on its supporting-post the truck may compensate for all the unevenness of the ground over which it travels. The truck as a whole may be raised and lowered by raising and lowering its supporting-post in the manner before described, so that the front of the plow or cultivator may be adjusted to different elevations. The upper end of the post is provided with a shaft-supporting arm 19, to which a tongue may be connected, and a doubletree 20 is mounted at the front end of the truck-frame 10 and is connected at its ends to an equalizing chain or cord 21, which passes through pulleys or rollers 22, mounted in brackets secured to the front cross-bar of the framework.

As before intimated, the plows or other cultivating devices are arranged in gangs, those of each gang being arranged for simultaneous operation. In the present instance for the direct support of the plows or other cultivating devices I provide a series of draw-bars 23, which are pivoted by their front ends to a convenient portion of the framework and which carry at their rear ends the plows or other cultivating devices 24. In the present instance there are two gangs of plows shown, and each gang consists of two pairs of plows 24 and two pairs of draw-bars 23. One pair of draw-bars is pivotally swung to the under side of the front cross-bar 2, while in regard to the other pair of cross-bars one of the latter is swung under one of the diagonal braces of the framework, while the other is swung from a bracket secured to the adjacent side bar of the framework. The plows of each pair are connected together in the present instance by means of diagonally-extending straps 25, and the points of attaching the plows to the draw-bars and the points of pivoting the latter to the framework are so related that the plows of each gang are arranged one in advance of the other and in a diagonal arrangement, as best seen in Fig. 2 of the accompanying drawings.

26 designates colter-standards which are pivotally mounted intermediate of their ends to certain of the draw-bars 23 and are provided at their forward ends with a slot 27, designed to receive a clamping-nut 28, so that the colter-wheel 29, carried by said standard, may by the angular adjustment of the standard be caused to travel at varying degrees of depth in the furrow. In connection with these colters I may under certain circumstances provide a cultivator with additional colters 29 and standards 30, each of which is provided with clamps 31, by which they may be detachably secured in front of each plow for use in soddy ground. The equalizing-draft adjustment before described, the colters, and the raising and lowering crank-axles at the rear of the framework assist in reducing side draft, as do also bifurcated brackets 32, which are rigidly secured to the framework and depend therefrom with their spaced members embracing the draw-bars 23, so that the draw-bars are prevented from twisting or sluing.

For yieldingly holding the cultivating shovels or plows to their work I have provided the following means: Guide-rods 34 are secured at their lower ends to the rear ends of the respective draw-bars 23, and the upper ends of said guide-arms extend through swivel-bars 35. The bars 35 are journaled in and between the extremities of a pair of arms 36, which are fast at their inner ends to shafts 37, 38, 39, and 40. The guide-rods are provided at their lower ends with set-collars 41, against which encircling springs 42 bear at their lower ends and bear at their upper ends against the swivel cross-bar. The upper ends of the guide-rods are provided with adjustable collars 43, designed to be adjusted and held at different position on the upper end of the rods by means of set-screws 44. The collars 43 are intended to bear on the upper sides of the swivel-bars, and by means of this arrangement the said draw-bars are yieldingly mounted and are pressed by the springs into engagement with their work, while at the same time they are permitted to yield upwardly when the cultivating shovels or plows strike any unusually hard obstacle. The guide-rods may also, it is manifest, be adjusted vertically, so as to hold the drawbars and shovels or plows at different elevations.

The actuating-shafts 37 and 38 are journaled in alinement with each other in suitable boxing supported on the rear extension of the side bars and central bar of the framework, and they are preferably square in cross-section, as are the other two actuating-shafts, so as to form a ready means to fasten the arms 36 thereto. The shaft 37 is connected to the shaft 39 by a crank-and-link connection 45, as shown, and likewise the shaft 38 is connected to the shaft 40, so that both pairs of shafts just mentioned are arranged for simultaneous actuation. The two shafts 39 and 40 are journaled between the quadrant-bars 5 and the central bar of the framework and carry hand-levers 46, arranged for adjustable connection with quadrants 47, secured to the quadrant-bars.

48 designates the driver-seat, mounted on the framework in contiguous relation to all of the hand-levers for the actuation of the various shafts of the cultivator. If desired, mud scrapers or guards 49 may be secured with their outer ends adjacent the treads of the wheels. As shown best in Figs. 1 and 2, the cranked portions of the shafts or axles 7 are connected directly to the side bars of the framework by means of tension-springs 50.

It is to be understood that my improved gang-cultivator may be made out of any suitable material, either iron or steel, and that various changes in the details of construction may be made without departing from the scope of the invention as defined in the appended claims.

Having thus described the invention, what is claimed as new is—

1. A gang-cultivator comprising a framework, two sets of draw-bars pivotally mounted at their front ends underneath the framework and carrying cultivating devices arranged in two oppositely and diagonally extending gangs, two transverse shafts in alinement with each other and journaled in the rear end of the framework, two other shafts in advance of the first-named shafts and also in alinement with each other and journaled in the framework parallel with the first-named shafts, two hand-levers each of which is arranged to actuate one of the advanced shafts, a connection between each of said advanced shafts and the shaft in the rear thereof whereby the shafts that are one in advance of the other will operate simultaneously, and upwardly-yielding connections between sundry of the draw-bars and all of said shafts.

2. A gang-cultivator comprising a framework, draw-bars pivotally mounted at their front ends in said framework, manually-operable means connected to the rear ends of said draw-bars for raising and lowering the same, cultivator-shovels carried by the rear ends of said draw-bars, and guide-brackets rigidly secured to the framework and designed to hold said draw-bars as against lateral strain.

3. A gang-cultivator comprising a framework, draw-bars pivotally mounted at their front ends in said framework, manually-operable means connected to the rear ends of said draw-bars for raising and lowering the same cultivator-shovels carried by the rear ends of said draw-bars, and bifurcated brackets secured to said framework and embracing the draw-bars and designed to guide the same in their vertical movement.

4. A gang-cultivator comprising a framework, rearwardly-extending draw-bars pivotally connected at their front ends to said framework and carrying cultivating devices, braces connecting together every two adjacent draw-bars whereby the latter are arranged in pairs, and brackets secured to the framework and straddling one draw-bar of each pair, as and for the purpose set forth.

5. A cultivator provided at its rear with main traveling wheels and at its front end with a vertically-adjustable truck mounted to freely tilt from side to side, and front traveling wheels mounted at the ends of said truck.

6. In a cultivator, a truck for the front end thereof embodying upper and lower horizontal bars spaced apart from each other, a vertically and axially movable post mounted in said bars and provided with a tongue-supporting arm, a bracket secured to said post, a quadrant attached to the bracket, a hand-lever fulcrumed intermediate of its ends on the bracket and having a link connection with one of said bars and arranged for adjustable engagement with the quadrant and a laterally-tiltable wheeled truck mounted on the lower end of said post.

7. In a cultivator of the type described the combination of a framework, traveling wheels therefor independent crank-axles for said traveling wheels, means for independently actuating said axles, and a vertically-adjustable and tilting truck on which the front end of the framework is mounted.

In testimony whereof I affix my signature in presence of two witnesses.

CHARLES BJORKLUND. [L. S.]

Witnesses:
H. C. THOMSON,
CHAS. L. COMBES.